June 7, 1949.  R. L. FRYER, JR  2,472,102

METERING DEVICE

Filed Oct. 5, 1944

INVENTOR.
ROSS L. FRYER, JR.

BY
C. E. Herrstrom & H. E. Thibodeau
ATTORNEYS

Patented June 7, 1949

2,472,102

UNITED STATES PATENT OFFICE 2,472,102

METERING DEVICE

Ross Lauder Fryer, Jr., Washington, D. C.

Application October 5, 1944, Serial No. 557,360

2 Claims. (Cl. 222—361)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to metering devices and particularly to metering devices adapted to deliver predetermined quantities of fluid.

Although it is a primary object of the present invention to provide a metering device for delivering small quantities of liquid fuel to heaters, the invention may be also used to meter other types of fluid and for other uses.

It is an object of the invention to provide a metering device for measuring and delivering a specific and accurate quantity of fuel, and which eliminates the necessity for orifices and passages of small diamter which may readily become partially or wholly clogged.

Another object of the invention is to provide a metering device for furnishing liquid fuel to heaters in which the fuel supply is never in direct communication with the heater and which thus eliminates the possibility of flooding the heater and also reduces the danger of fire to a minimum.

It is a further object of the invention to provide a metering device in which the quantity of fluid delivered may be readily adjusted.

Still another object of the present invention is to construct a metering device for furnishing liquid fuel to the heater in which the rate of flow of fluid delivered by the metering device varies in direct relation to the speed of the blower motor furnishing air to the burner of the heater.

Other objects of the invention will be made more apparent as this description proceeds, particularly in connection with the accompanying drawings in which.

Figure 4:
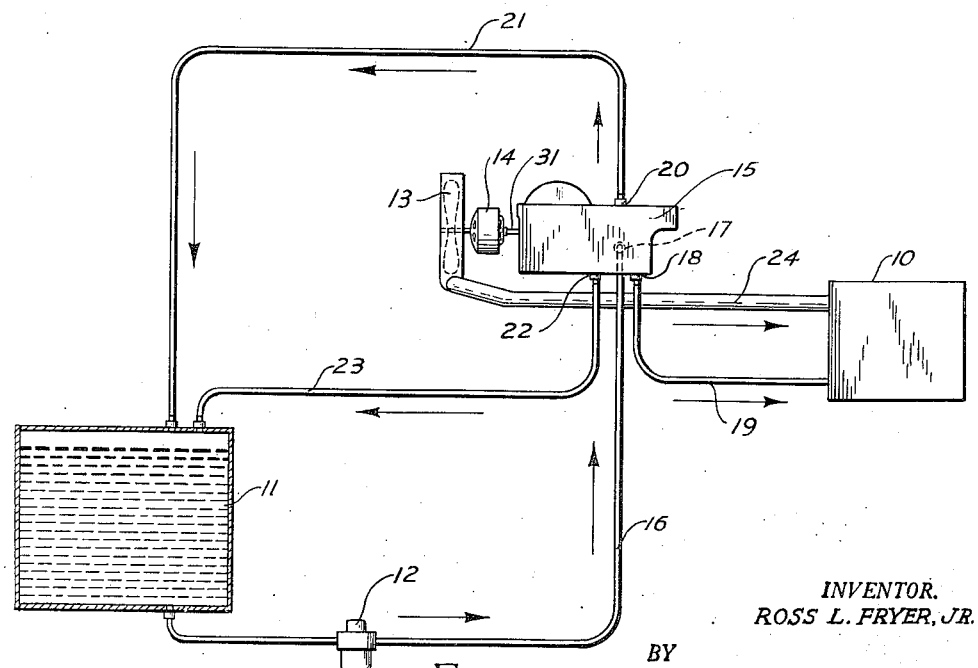
Fig. 4 is a semi-diagrammatical view of a heater system embodying the metering device shown in Figures 1 to 3.

Referring now to the drawings, and particularly to Fig. 4, it will be noted that I have shown a heater system including a heater 10, fuel reservoir 11, fuel pump 12, blower 13, blower motor 14, and metering device 15. Liquid fuel from the reservoir 11 is pumped by the fuel pump 12 through the tube 16 to the inlet port 17 of the metering device. Predetermined quantities of fuel are metered by the metering device 15 and are delivered through the outlet port 18 and the tube 19 to the burner of the heater 10. Excess fuel pumped by the pump 12 and not metered to the outlet port 18 is returned to the reservoir through the return port 20 and the tube 21. Leakage fluid within the metering device 15 is returned to the reservoir 11 through the drain port 22 and the tube 23.

Air is supplied to the burner of the heater 10 for combustion of the fuel by means of the blower 13, blower motor 14, and the connecting tube 24. In some instances the blower 13 also forces air through the heater to conduct heat into the compartment or area to be heated. In addition to driving the blower 13 the motor 14 performs another function, namely to provide the necessary power for operating the metering device, as more fully described hereinafter.

The metering device 15 is preferably mounted above the fuel reservoir 11 in order that the leakage fluid may be returned by gravity to the reservoir. The metering device is also located above the heater 10 to provide for gravity flow of fuel to the heater. Since the reservoir is below the metering device, the fuel pump 12 is necessary to pump the fuel to the metering device.

Figure 1:
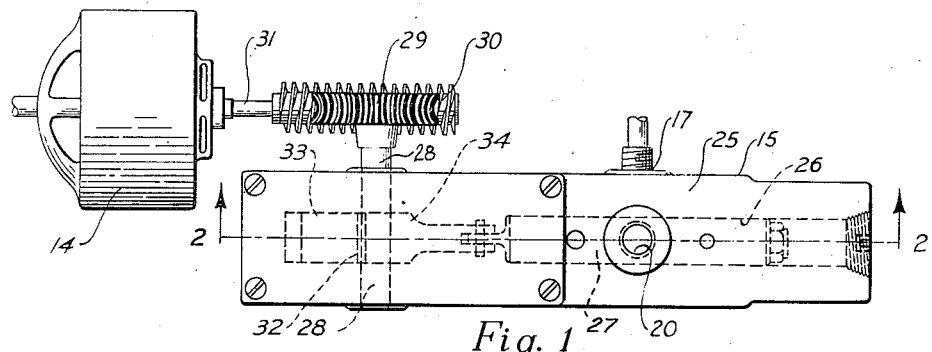
Fig. 1 is a plan view of a metering device constructed in accordance with the present invention.
Figures 2, 3:
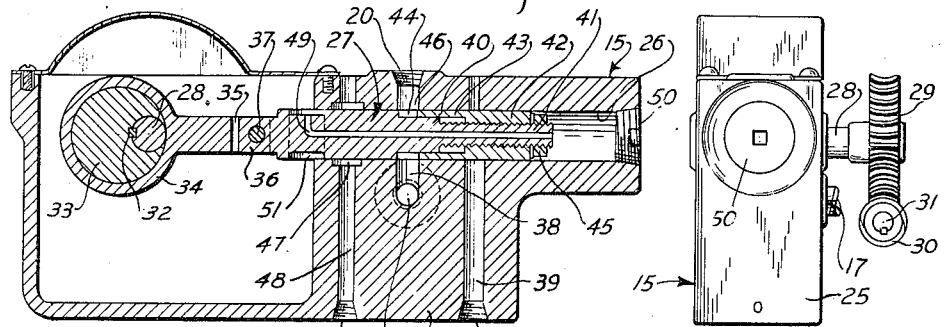
Fig. 2 is a vertical sectional view taken on the plane indicated by the line 2—2 of Fig. 1.
Fig. 3 is an end elevation of the construction shown in Figures 1 and 2.

With reference now to Figures 1 to 3, inclusive, the metering device 15 comprises a housing 25 which is preferably a metal casting and which is provided with a longitudinally extending cylindrical bore 26. Positioned within the bore 26 is a plunger 27 adapted to be reciprocated to control the delivery of fluid from the inlet port 17 to the outlet port 18.

A cross-shaft 28 is journalled at one end of the housing 25 and has one end extending laterally from the housing and carrying a worm wheel 29 at its outer extremity. The worm wheel 29 is driven by a worm 30 mounted upon the shaft 31 of the blower motor 14. Keyed to the shaft 28 by the key 32 is an eccentric 33, which in turn carries a crank 34. The outer end 35 of the crank 34 is bifurcated and is pivotally connected to the extending flange 36 of the plunger 27 by means of a pin 37. It will be apparent that the blower motor 14, through the reduction effected by the worm 30 and worm wheel 29, reciprocates the plunger 27 within the bore 26 of the housing.

Passages 38 and 39 in the housing 25 communicate at their outer ends with the inlet port 17 and the outlet port 18 respectively and at their inner ends with the interior of the bore 26 at spaced points. The plunger 27 has a portion of reduced diameter 40 intermediate its ends and a still further reduced portion 41 at one end. The end portion 41 is threaded and receives a sleeve 42 having a forwardly extending annular shell 43, the inside diameter of which corresponds with the outside diameter of the reduced portion 40 of the plunger 27.

As best seen in Figure 2, the annular shell 43 telescopically engages the portion 40 of the plunger and cooperates therewith to form an annular chamber 44 which is adapted to communicate with the passage 38 in one position of the plunger and with the passage 39 in another position. The size of the annular chamber 44 may be readily adjusted by screwing the sleeve 42 along the threaded portion 41 of the plunger. After being adjusted, the sleeve 42 may be locked in position by means of a lock nut 45.

The spacing between the passages 38 and 39 and the throw of the eccentric 33 are so designed that in one extreme position of the plunger 27 the annular chamber 44 is aligned with the passage 39. In the position of the parts shown in Figure 2, fluid entering the inlet port 17 flows through the inlet passage 38 into the annular chamber 44 and is returned to the reservoir through the return passage 46 and the return port 20. When the plunger 27 is reciprocated to the right, a specific quantity of fuel is trapped in the annular chamber 44 and, at the end of the reciprocation, is deposited in the outlet passage 39 and fed by gravity to the heater. The return stroke of the plunger again aligns the annular chamber with the inlet passage 38 and it will thus be apparent that each complete reciprocation of the plunger results in transfering a predetermined quantity of fuel from the inlet passage 38 to the outlet passage 39. The quantity of fuel transferred corresponds to the volume of the annular chamber 44.

Inasmuch as the blower motor 14 supplies the power for reciprocating the plunger 27, the rate of flow of fluid delivered by the metering device varies in accordance with the speed of the motor and, since the motor also operates the blower for furnishing air to the burner of the heater, it is apparent that air and fuel are always delivered to the heater in proportion regardless of the speed of the motor. Consequently, for any given rate of heater operation, there is assured sufficient air for the proper combustion of the amount of fuel delivered.

With the present construction, the necessity for small orifices and passages which may readily clog is entirely eliminated since all of the fluid passages in the present device are of relatively large size. In addition, the need for constant level devices and float mechanisms which generally cause mechanical malfunctioning is also eliminated.

The outside diameters of the plunger 27 and the sleeve 42 and the inside diameter of the bore 26 are accurately machined to close limits, thereby insuring a good fit therebetween and eliminating the necessity for piston rings or other seals. Should there be a slight leakage of fluid between the plunger or the sleeve and the housing, means are provided for returning this leakage to the reservoir. The drain port 22 in the housing communicates with an annular passage 47 surrounding the plunger 27 by means of the drain passage 48. A longitudinally extending passage 49 is provided in the plunger 27 and communicates at one end with the interior of the bore 26 between the end of the plunger and the plug 50 closing the end of the bore and at its opposite end with an annular chamber 51 extending around the periphery of the plunger. It will thus be seen that fluid leaking between the housing and the plunger 27 is collected in the annular chamber 51 which, during a portion of the reciprocation of the plunger, is in alignment with the annular passage 47 in the housing, thus returning the leakage fluid to the drain passage 48. Leakage between the housing 25 and the sleeve 42 is returned through the passage 49 and the annular chambers 51 and 47 to the drain passage 48.

The additional load placed upon the blower motor is extremely small, since the metering device is not a pump and does not function against a back pressure, and the only power necessary is that required to overcome the friction in the device.

Two means are available for varying the total volume of fluid delivered by the metering device. The first is by varying the speed of the blower motor which increases the rate of reciprocation of the plunger; and the second is by adjusting the sleeve with respect to the plunger to vary the size of the annular chamber which transfers the fuel from the inlet passage to the outlet passage.

The possibility of flooding the heater burner is eliminated with the present construction since the fuel supply is never in direct communication with the heater. This feature also reduces the danger of fire to a minimum. The fire hazard is also reduced by the fact that the entire unit is self-draining, thus automatically removing all leakage fluid from the device. Although the invention has been described in connection with its use to meter and deliver small quantities of liquid fuel to a heater, the device is also applicable to any metering problem involving fluids and may also be used for many other purposes besides that described. In addition, it is not necessary that the device be actuated by a blower motor since any source of power may be used. It is an important feature of the invention, however, that by suitably coupling the plunger to a driving part of the mechanism with which the metering device is used, fluid may be delivered at a rate proportionate to the operation of the device and in timed relation thereto.

Although specific embodiments of the invention have been illustrated and described, it will be understood that various alterations in the details of construction may be made without departing from the scope of the invention as indicated by the appended claims.

What I claim is:

1. A device for metering fluids supplied under pressure to said device comprising, in combination, a housing member provided with a plurality of passages including a fluid inlet, a metered fluid outlet, an excess fluid outlet, and a drain outlet, whereby fluids may enter into and be discharged from the said housing member, and a longitudinal bore formed within the said housing member communicating with each of the said passages; a plunger member reciprocable within the said bore having two chambers therein, one of the said chambers being of a predeterminable capacity and adapted to communicate with the fluid inlet passage in one position and with the metered fluid outlet in another position, and the other of said chambers being arranged to cooperate with a passage formed in the said plunger member whereby the housing member bore may be cleared of any fluid which has leaked between the said housing member and the said plunger through the reciprocating action of the said plunger; means for adjusting said predeterminable capacity of said one of the said chambers in the said plunger; and means for reciprocating the said plunger within the said bore to alternately align said one of said chambers of predeterminable capacity with the fluid inlet and the metered fluid outlet and to align said other of said chambers of said plunger with said drain outlet.

2. A device for metering fluids supplied under pressure to said device comprising a housing having a bore therein, said housing being provided wth a plurality of fluid passages therein communicating with said bore at spaced points, said passages including a fluid inlet, a metered fluid outlet, an excess fluid outlet and a fluid drain, said fluid inlet being in axial alignment with said excess fluid outlet, a plunger reciprocable within said bore and having an annular peripheral chamber adapted to communicate in one position with said fluid inlet and said excess fluid outlet and in another position with said metered fluid outlet, said plunger further having a passage extending longitudinally therethrough and adapted to communicate with said fluid drain, and means for reciprocating said plunger to alternately align said chamber with said fluid inlet and excess fluid outlet and with said metered fluid outlet to transfer a predetermined quantity of fluid from said fluid inlet to said metered fluid outlet during each reciprocation of said plunger and to align said passage extending longitudinally through said plunger with said fluid drain, whereby fluid leakage between said housing and said plunger may be removed from said bore.

ROSS LAUDER FRYER, Jr.

REFERENCES CITED

The following references are of record in the file of this patent:

UNITED STATES PATENTS

| Number | Name | Date |
| --- | --- | --- |
| 617,019 | Hollan | Jan. 3, 1899 |
| 933,528 | Bruce | Sept. 7, 1909 |
| 1,067,994 | Lundin | July 22, 1913 |
| 1,110,135 | Henderson | Sept 8, 1914 |
| 1,880,857 | Davis | Oct. 4, 1932 |
| 2,263,833 | Aldrich | Nov. 25, 1941 |
| 2,282,110 | Angell | May 5, 1942 |
| 2,378,379 | Behrens | June 19, 1945 |
| 2,391,806 | Thompson | Dec. 25, 1945 |